(12) United States Patent
Kim

(10) Patent No.: US 6,665,383 B1
(45) Date of Patent: Dec. 16, 2003

(54) REMOTE CONTROL MODULE FOR COMPUTER AND METHOD THEREOF

(76) Inventor: Seong-Hwan Kim, 502-202, Jugong Apt., 6, Byulyang-dong, Gwacheon-si, Gyeonggi-do (KR)

(*) Notice: Subject to any disclaimer, the term of this patent is extended or adjusted under 35 U.S.C. 154(b) by 0 days.

(21) Appl. No.: 10/284,323

(22) Filed: Oct. 31, 2002

(30) Foreign Application Priority Data

Sep. 19, 2002 (KR) .................................. 2002-0057248

(51) Int. Cl.[7] .............................................. H04M 11/00
(52) U.S. Cl. ............................. 379/102.02; 379/93.26; 713/310
(58) Field of Search ...................... 379/102.01–102.04, 379/102.07, 106.01, 93.01, 93.05–93.07, 93.18, 93.24–93.28, 93.37; 713/310, 323

(56) References Cited

U.S. PATENT DOCUMENTS 5,379,341 A * 1/1995 Wan ....................... 379/102.04
6,160,873 A * 12/2000 Truong et al. ......... 379/102.02

* cited by examiner

Primary Examiner—Wing Fu Chan
(74) Attorney, Agent, or Firm—Foley & Lardner

(57) ABSTRACT

Disclosed is a remote control module for a computer, which creates an order to control a shut down and a start of a computer system by analyzing a DTMF (dual tone multi frequency) signal received through a telephone line. The remote control module has a telephone line interface section for outputting the DTMF signal received through the telephone line by converting the DTMF signal into a predetermined voltage level, an amplifying section for amplifying and filtering the signal transmitted from the telephone line interface section, an A/D converter, a control section for extracting a computer remote control order from the DTMF signal and for creating a message based on the computer remote control order, a first relay to output a reset signal, a second relay to output a power on/off signal and a serial transmission interface section for receiving the message from the control section and transmitting the message to the computer system by converting the message to match with a serial transmission interface standard.

18 Claims, 6 Drawing Sheets

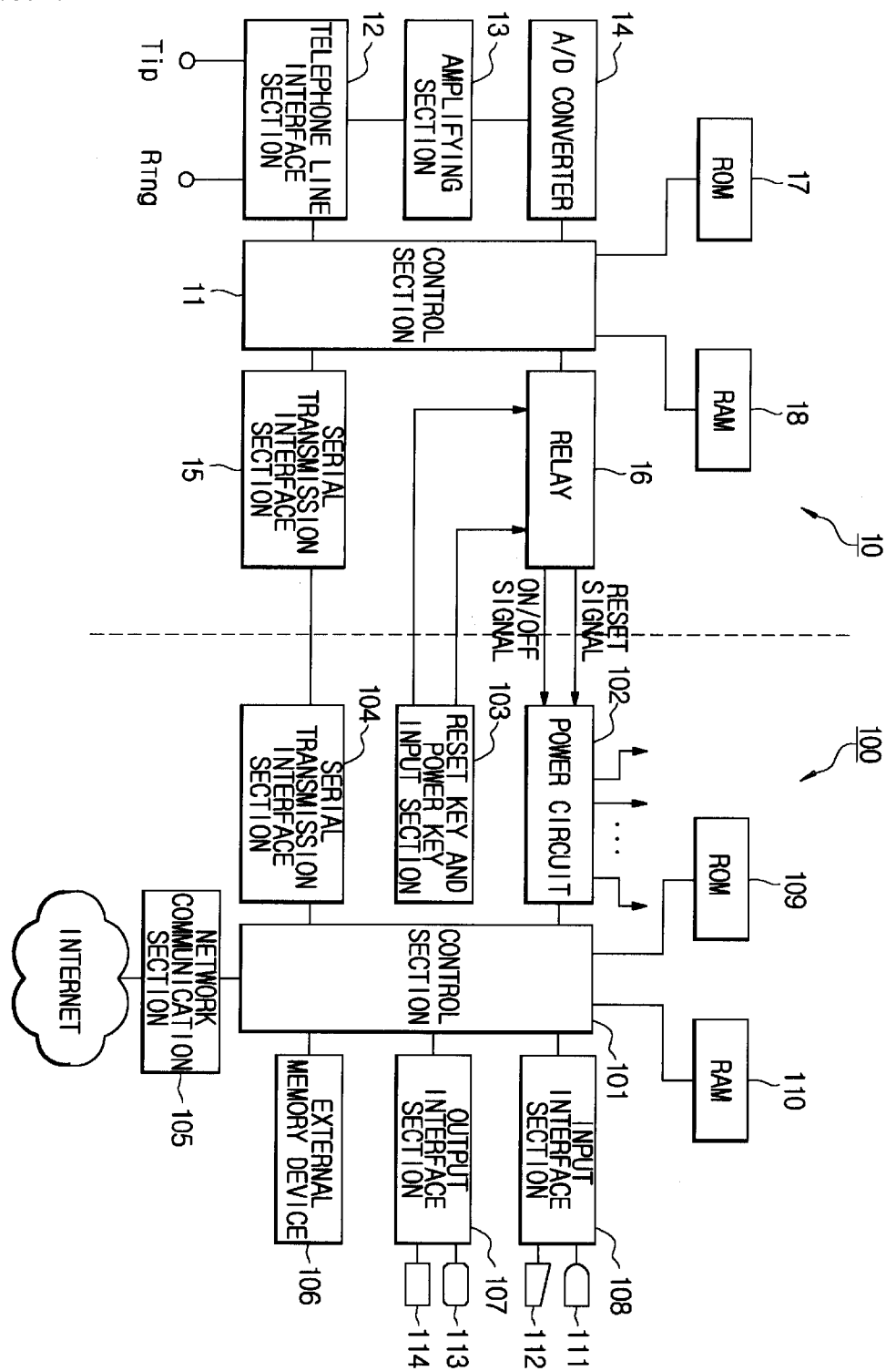

REMOTE CONTROL MODULE FOR COMPUTER AND METHOD THEREOF

CROSS-REFERENCE TO RELATED PATENT APPLICATIONS

South Korea Priority Application 2002-57248, filed Sep. 19, 2002 including the specification, drawings, claims and abstract, is incorporated herein by reference in its entirety.

BACKGROUND OF THE INVENTION

1. Field of the Invention

The present invention relates to a method and an apparatus for remote-controlling a computer, and more particularly to a method and an apparatus for remote-controlling a computer based on a DTMF (dual tone multi frequency) signal, which is received through a telephone line.

2. Description of the Related Art

Recently, as the Internet has been rapidly developed, the signaling speed in a personal computer has been remarkably improved. Thus, a user can download or upload files having mass capacity by accessing to a computer located in a remote place, or can use the remote computer by using a control program of the remote computer as if the user makes a local-login to the remote computer.

In an area having a LAN environment, a remote access to a computer can be achieved by using an IP (Internet protocol) address of a relative computer. In an area where the LAN environment is not provided, the communication between two computers can be achieved by connecting two computers through PSTN or MODEM.

However, although the communication environment has been improved, it is required to have an IP address (fixed or flexible IP address) of the remote computer or a telephone number of MODEM connected to the remote computer in order to access to the remote computer. In addition, the remote computer should be powered on.

For this reason, a LAN card available from a predetermined manufacturing company allows the computer to be powered on from a remote place. However, the LAN card is implemented based on the fixed IP address of the computer, so the remote-control of the computer by using the LAN card is impossible under a DHCP (dynamic host configuration protocol) environment, where the IP address of the computer is unknown.

Besides, many well-known techniques are used to forcibly power on the computer through a telephone line. However, those techniques use hardware to forcibly power on the computer. Accordingly, a complex work for correcting hardware of the computer is required. In addition, according to those techniques, it is impossible to normally shut down or reset the computer through an OS (operating system), so the system may be subject to a fatal damage. Furthermore, even if the computer has been powered on, it is impossible to access to the computer from the remote place if the IP address (fixed or flexible IP address) is unknown, so that the user cannot make the communication.

SUMMARY OF THE INVENTION

Accordingly, the present invention has been made to solve one or more of the above-mentioned problems occurring in the prior art, and a first object of an embodiment of the present invention is to provide a method and an apparatus for transmitting an order for controlling a computer to the computer through a serial transmission interface by receiving the order from a DTMF signal, which is received through a telephone line.

A second object of an embodiment of the present invention is to provide a method and an apparatus for transmitting an IP address of a remote computer to a local computer through a serial transmission interface by obtaining the IP address of the remote computer through a telephone line.

A third object of an embodiment of the present invention is to provide a method and an apparatus for automatically accessing to a remote computer by obtaining an IP address of the remote computer from a DTMF signal, which is received through a telephone line.

A fourth object of an embodiment of the present invention is to provide a method and an apparatus for remote-controlling various functions of a computer including power on/off, hardware reset, normal system shut down, and normal software reset.

A fifth object of an embodiment of the present invention is to provide a method and an apparatus capable of automatically creating an E-mail including an IP address of a computer, and transmitting the E-mail to predetermined E-mail addresses.

In order to accomplish one or more of the above objects, according to one aspect of the present invention, there is provided a remote control module for a computer, which creates an order to control a shut down and a start of a computer system by analyzing a DTMF (dual tone multi frequency) signal received through a telephone line. The remote control module comprises a telephone line interface section for outputting the DTMF signal received through the telephone line by converting the DTMF signal into a predetermined voltage level; an amplifying section for amplifying and filtering the signal transmitted from the telephone line interface section; an A/D converter for converting an analog signal of the amplifying section into a digital signal; a control section for extracting a computer remote control order from the DTMF signal by analyzing the digital signal transmitted from the A/D converter, and for creating a message based on the computer remote control order; a first relay controlled by the control section so as to output a reset signal to a reset terminal of a power circuit of the computer system; a second relay controlled by the control section so as to output an power on/off signal to a power terminal of the power circuit of the computer system; and a serial transmission interface section for receiving the message from the control section and transmitting the message to the computer system by converting the message in match with a serial transmission interface standard.

BRIEF DESCRIPTION OF THE DRAWINGS

The above objects and other features and advantages of the present invention will be more apparent from the following detailed description taken in conjunction with the accompanying drawings, in which:

FIG. 1 is a block view showing a computer unit having a remote control module according to one embodiment of the present invention;

DETAILED DESCRIPTION OF THE PREFERRED EMBODIMENTS

Figure 2A:
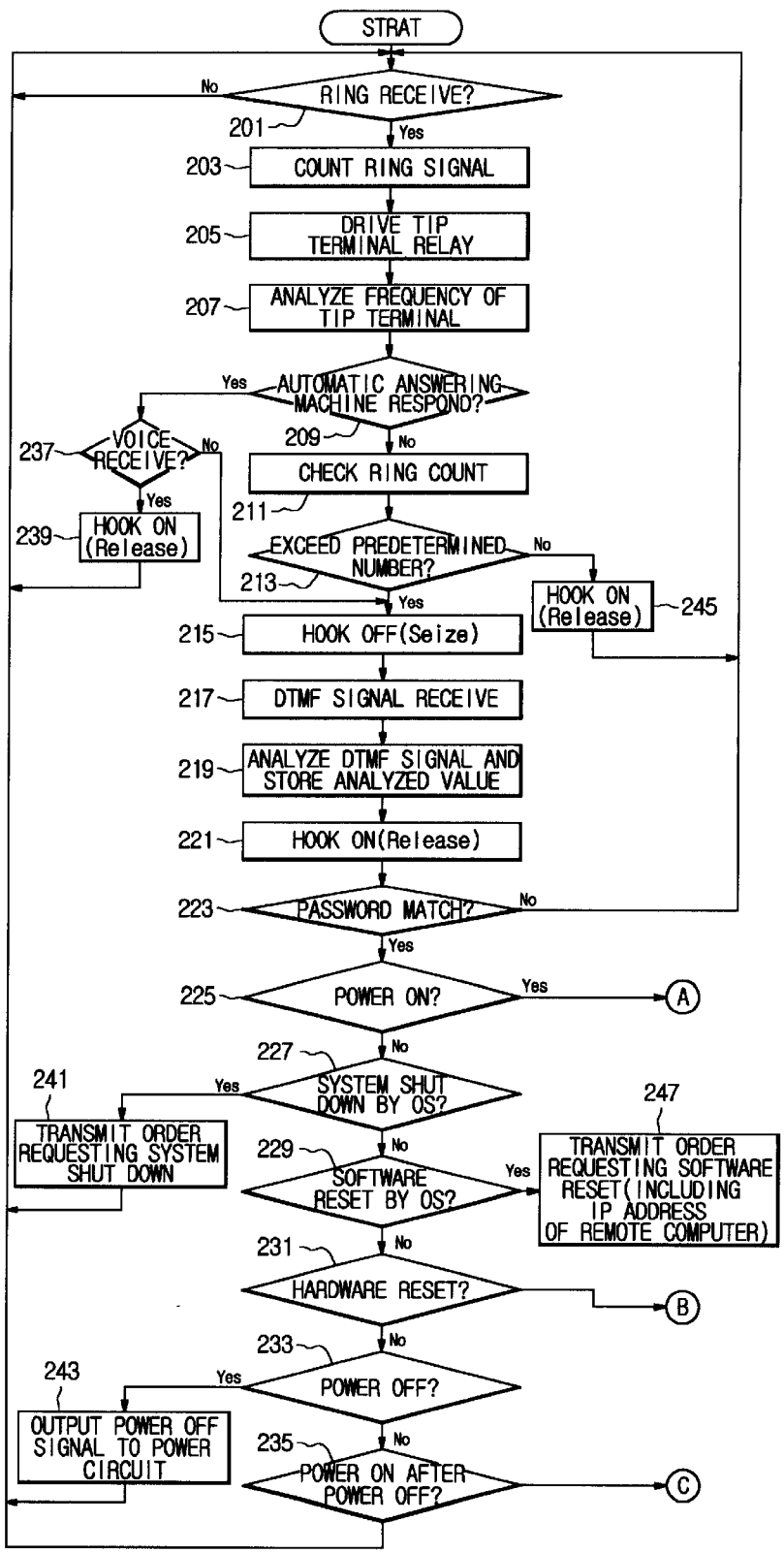
FIGS. 2A to 2D are flow charts showing a control flow of a remote control module according to one embodiment of the present invention.
Figure 2B:
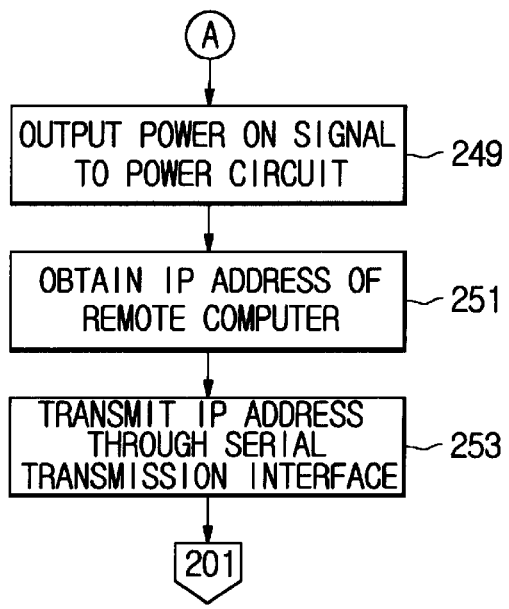
Figure 2C:
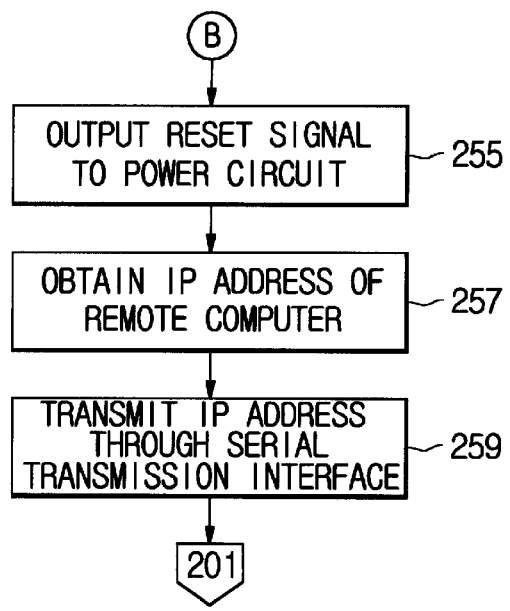
Figure 2D:
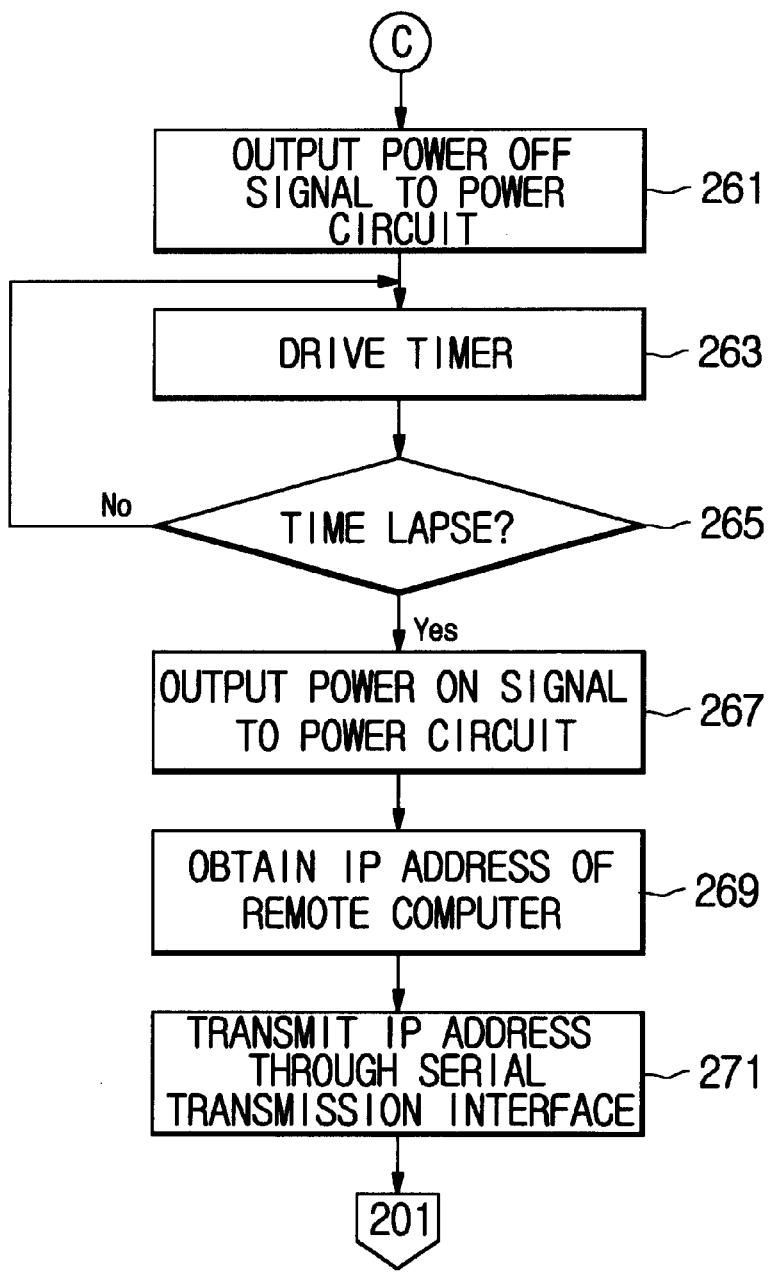

Hereinafter, a preferred embodiment of the present invention will be described with reference to the accompanying drawings. In the following description of the present invention, a detailed description of known functions and configurations incorporated herein will be omitted when it may make the subject matter of the present invention rather unclear.

Hereinafter, a method and an apparatus for remote-controlling a computer based on a DTMF signal received through a telephone line according to the present invention will be described. Here, power on/off of a computer, hardware reset, and normal system shut down and software reset through an OS (operating system) are subject to be controlled. In addition, the present invention is characterized in that a local computer automatically accesses to an IP address of a remote computer, which is received through a telephone line, so as to provide an environment allowing the remote computer to access to the local computer, and an IP address of the local computer is transmitted to a predetermined E-mail address when resetting a system or by remote-controlling the computer such that a user located in a remote place can recognize the IP address of the local computer.

FIG. 1 is a block view showing a computer unit having a remote control module according to one embodiment of the present invention. Although it is described below that the remote control module is accommodated in a main frame of the computer unit, the remote control module can be provided as a separated device.

As shown in FIG. 1, the computer unit mainly has a remote control module 10 and a computer system 100 included in a personal computer (PC). The remote control module 10 includes a control section 11, a telephone line interface section 12, an amplifying section 13, an A/D converter 14, a serious transmission interface section 15, a relay 16, an ROM 17, and an RAM 18. The control section 11 includes a DSP chip for processing a digital signal and a PLD (programmable logic device) for relaying a communication between the DSP chip and peripheral devices. The computer module 100 includes a CPU 101, a power circuit 102, a reset key and power key input section 103, a serial transmission interface section 104, a network communication section 105, an external memory device 106, an output interface section 107, an input interface section 108, an ROM 108 and an RAM 110.

The telephone line interface section 12 of the remote control module 10 has a tip terminal and a ring terminal for receiving a telephone call. If a ring signal is received through the ring terminal, the telephone line interface section 12 outputs a high signal to the control section 11. Then, if a tip terminal relay (not shown) is driven by the control section 11, the telephone line interface section 12 converts the signal received through the tip terminal into a DC 5V signal and outputs it, such that the control section 11 recognizes the signal. The amplifying section 13 converts the DC 5V signal into an analog signal within 5V by amplifying and filtering the DC 5V signal of the telephone line interface section 12 and outputs it. The A/D converter 14 converts the analog signal transmitted from the amplifying section 13 into a digital signal having a predetermined bit (for example, 8 to 12 bit) and outputs it to the control section 11.

The ROM 17 stores program data required for operating the control section 11 and fixing data required for executing a program. The RAM 18 stores temporary data created while the program is being executed. The control section 11 controls the whole operation of the remote control module 10. Especially, the control section 11 analyzes frequencies of the digital signals (DTMF, tone, voice signal . . . ) of the A/D converter 14 through an FFT (fast Fourier transform) so as to control the remote control module 10 based on analyzed frequency data.

For example, when analyzing the DTMF signal (which is generated when a user pushes a key of a telephone and two frequency signals are generated with respect to one key), if there is an order indicating the reset or power on/off of the computer, the control section 11 controls the relay 16 such that a control signal can be outputted to a reset terminal or a power terminal of the power circuit 102. In addition, if there is an order for performing a system shut down or a software reset through the OS, the control section 11 outputs an order requesting the system shut down or the software reset to the serial transmission interface section 15 such that the order can be transmitted into the control section 101 of the computer system 100. In addition, when the IP address of the remote computer is received through the telephone line, the IP address is outputted to the serial transmission interface section 15 such that the IP address of the remote computer can be transmitted into the control section 101 of the computer system 100. If there is an order to transmit an IP address E-mail, the control section 11 outputs an order requesting the transmission of the E-mail to the serial transmission interface section 15 such that the order can be transmitted into the control section 101 of the computer system 100.

The relay 16 has a first relay for generating a hardware reset signal and a second relay for generating a power on/off signal. The first relay is driven by means of the control signal of the control section or a reset signal of the reset key input section 103 (which is generated when the user pushes the reset key), so as to output the reset signal to the reset terminal of the power circuit 102. The second relay is driven by means of the control signal of the control section or a power key signal of the power key input section 103 (which is generated when the user pushes the power key), so as to output the power on/off signal to the power terminal of the power circuit 102. The first and second relays are shut off after maintaining on-state about 3–4 seconds such that the computer can be powered on/off or reset. The serial transmission interface section 15 transmits data of the control section 11 to the computer system 100 by converting data into a serial transmission interface standard (for example, RS232C (recommended standard-232C)).

The power circuit 102 of the computer system 100 creates a DC voltage of 5V, 3.3V and 12V used in the computer system 100 and supplies the DC voltage to corresponding elements or shuts off the DC voltage being supplied to the corresponding elements. In addition, the power circuit 102 according to the present invention performs the reset operation and the power on/off operation in response to the reset signal and the power on/off signal transmitted from the remote control module 10. The reset key and power key input section 103 outputs a key input signal as a driving signal of the relay 16 when the reset key or the power key is inputted by the user.

The control section 101 executes various programs under the control of the OS. For example, the CPU 101 includes a CPU chip of "Pentium", "MMX technology Pentium" or "Pentium Pro" available from an Intel company, a CPU available from an AMD company, and "Power PC" available from an IBM company. Especially, the control section 101 of the present invention analyzes a message received from the remote control module 10 and performs the system shut down and the software reset through the OS based on analyzed data. The ROM 109 stores program data required for operating the control section 101 and fixing data required for executing a program. The RAM 110 stores temporary data created while the program is being executed.

The network communication section 105 converts the message transmitted from the control section 101 into a packet in correspondence with a predetermined protocol standard (TCP/IP SPEC) and transmits the packet to the remote place through the Internet. In addition, the network communication section 105 extracts an information message from the packet transmitted through the Internet and transfers the information message to the control section 101. At this time, the network communication section 105 carries out the communication by using the fixing IP address or by using flexible IP address assigned from a DHCP server at a reset stage. Especially, the network communication section 105 automatically accesses to the IP address of the remote computer (TCP/IP access) received from the remote control module 10, or transmits the E-mail having the IP address of the computer system 100 to predetermined E-mail addresses under the control of the control section 101.

The input interface section 108 is a means for inputting various data and is connected to pointing devices, such as a mouse 111 and a key board 112. The output interface section 107 is a means for outputting various data and is connected to a display part 113 of a CRT and an LCD and a printer 114 for outputting a hard copy. The external memory device 106 is a mass storage facility and includes a hard disc, a floppy disc, a CD-ROM, and a DVD Hereinafter, an operation of the present invention will be described.

FIGS. 2A to 2D are flow charts showing a control flow of the remote control module 10 according to one embodiment of the present invention.

Referring to FIG. 2, the control section 11 checks whether or not a ring signal is received through the telephone line. If the ring signal is received, the control section 11 counts the number of incoming ring signal (step 203). Then, the control section 11 drives a tip terminal relay included in the telephone line interface section 12 (step 205), and analyzes the frequency of the signal received through the tip terminal (step 207). The signal analyzed by the control section 11 is a signal converted into the digital signal through the A/D converter 14. After that, the control section 11 determines whether or not the signal received through the tip terminal is a response tone of an automatic answering machine (step 209). The response tone is a signal having 1100–2100 Hz and the control section 11 recognizes the response tone of the automatic answering machine through the FFT.

If the response tone of the automatic answering machine is detected, the control section 11 checks whether or not a voice signal having 300–4000 Hz is received by analyzing the frequency through the FFT (step 237). If the voice signal is received, which means that a transmitter leaves a voice message in the automatic answering machine, the control section 11 performs a hooks on or release process (step 239) and returns to step 201 in order to check whether or not the ring signal is received. If the voice signal is not received, the control section 11 performs step 215.

In addition, if the response tone of the automatic answering machine is net detected in step 209, the control section 11 performs step 211 in order to detect the number of incoming ring signals by inspecting a ring count value, and checks whether or not the number of the incoming ring signals exceeds a predetermined number (for example, 20) (step 213). If the number of the incoming ring signals exceeds the predetermined number, the control section 11 performs a hooks off or a seize process (step 215) in order to occupy the telephone line. If the ring signal is stopped before it reaches the predetermined number, which means that the transmitter hangs up the phone or any one of incoming call terminals is hooked off, the control section 11 performs a hooks on process (step 245) and returns to step 201 in order to detect the incoming ring signal.

After occupying the telephone line, the control section 11 receives the DTMF signal through the telephone line (step 217), and extracts a computer remote control order by analyzing the frequency of the DTMF signal and stores the computer remote control order in a memory (step 219). In addition, the control section 11 performs a hooks on process (step 221). Then, the control section 11 checks whether or not a password included in the computer remote control order matches with a predetermined password. If two passwords match with each other, the control section 11 performs step 225. If two passwords are different from each other, the control section 11 returns to step 201 in order to continuously check the incoming ring signal.

When two passwords matches with each other, the control section 11 inspects whether or not the computer remote control order requests the power on of the computer (step 225). If the computer remote control order requests the power on of the computer, the control section 11 performs step 249 (shown in FIG. 2B). Otherwise, the control section 11 checks whether or not the computer remote control order requests the shut down of system by means of the OS (step 227). If the shut down of system by using the OS is requested, the control section 11 transmits an order requesting the shut down of system to the computer system 100 through the serial transmission interface (step 241). Otherwise, the control section 11 checks whether or not the computer remote control order requests the software reset by means of the OS (step 229). If the computer remote control order requests the software reset by means of the OS, the control section 11 transmits an order requesting the software reset (including IP address of remote computer obtained from the computer remote control order) to the computer system 100 through the serial transmission interface (step 247). Otherwise, the control section 11 checks whether or not the computer remote control order requests the hardware reset (step 231). If the computer remote control order requests the hardware reset, the control section 11 performs step 255 shown in FIG. 2C. Otherwise, the control section 11 checks whether of not the computer remote control order requests the power off (step 233). If the computer remote control order requests the power off, the control section 11 controls the relay 16 in order to output the power off signal to the power circuit of the computer system 100. Otherwise, the control section checks whether or not the computer remote control order requests the power on after the power off (step 235). If the computer remote control order requests the power on after the power off, the control section 11 performs step 261 shown in FIG. 2D. Otherwise, the control section 11 returns to step 201 in order to continuously inspect the incoming ring signal.

When the software reset by means of the OS is requested, the control section 11 controls the relay 16 in order to output the power on signal to the power terminal of the power circuit 102 (step 249). In addition, the control section 11 obtains the IP address of the remote computer from the computer remote control order (step 251). Then, the control section 11 transmits the IP address to the computer system 100 through the serial transmission interface 15 (step 253) and returns to step 201.

When the hardware reset is requested, the control section 11 outputs the reset signal to the reset terminal of the power circuit 102 by controlling the relay 16 (step 255). In addition, the control section 11 obtains the IP address of the remote computer from the computer remote control order (step 257). Then, the control section 11 transmits the IP address to the computer system 100 through the serial transmission interface 15 (step 259) and returns to step 201.

When the power on after power off is requested, the control section 11 controls the relay 16 in order to output the power off signal to the power terminal of the power circuit 102 (step 261). In addition, the control section 11 drives a timer, in which a predetermined time is preset, and checks whether or not the predetermined time preset in the timer has lapsed (step 265). If the predetermined time preset in the timer has lapsed, the control section 11 controls the relay 16 in order to output the power on signal to the power terminal of the power circuit 102 (step 267). In addition, the control section 11 obtains the IP address of the remote computer from the computer remote control order (step 269). Then, the control section 11 transmits the IP address to the computer system 100 through the serial transmission interface 15 (step 271) and returns to step 201.

Table 1 shown below represents a relationship between the analyzed value of the DTMF signal and the computer remote control order. Table 1 is an example only, and various orders can be set by variously combining keys (DTMF signals).

TABLE 1

| Analyzed value of DTMF signal | Order | Note |
| --- | --- | --- |
| *0503# | Password | No more than 8 characters including * and # |
| *1231# | Power on | |
| *1232# | Power off | |
| *1233* | Hardware reset | |
| *210#212#188#37* | IP address of remote computer | |
| *1234# | Shut down of system by OS | |
| *1235# | Software reset by OS | |
| *1246# | Retransmit IP address | |

Referring to Table 1, when the analyzed value of the DTMF signal is "*0503#*1231#*210#212#188#37*, the control section 11 powers on the computer and transmits the IP address (210.212.188.37) of the remote computer to the computer system so as to request the automatic access to the remote computer. On the other hand, if the analyzed value of the DTMF signal is *1246#, the control section 11 of the remote control module retransmits the transmitted IP address of the remote computer to the computer system so as to request the automatic access to the remote computer.

Although the above embodiment describes that a remote user inputs the password, order and IP address at once, it is also possible to input the password, order and IP address one by one in an interactive manner. For example, the control section 11 checks whether or not the password is inputted within a predetermined time while occupying the telephone line, and transmits the response tone of 2100 Hz through the telephone line when the password has been inputted. After transmitting the response tone, the control section 11 checks whether or not the order is received within a predetermined time, and transmits the response tone through the telephone line when the order has been inputted. Then, the control section 11 checks whether or not the IP address of the remote computer is received within a predetermined time. It is also possible to transmit a voice message instead of the response tone. For example, after receiving the password, a voice message "input a required code" can be transmitted.

According to the above embodiment, when the computer remote control order requests the start of the computer (power on, software reset by OS, hardware reset, and power on after power off), the computer remote control order always includes the IP address of the remote computer. However, it is not required for the user to always input the IP address. For instance, when the computer system 100 uses the fixed IP address, the user only inputs an order to power on the computer in a communication state because the user already knows the IP address of the computer. In this case, the remote control module 10 controls the computer system by using analyzed data.

Figure 3:
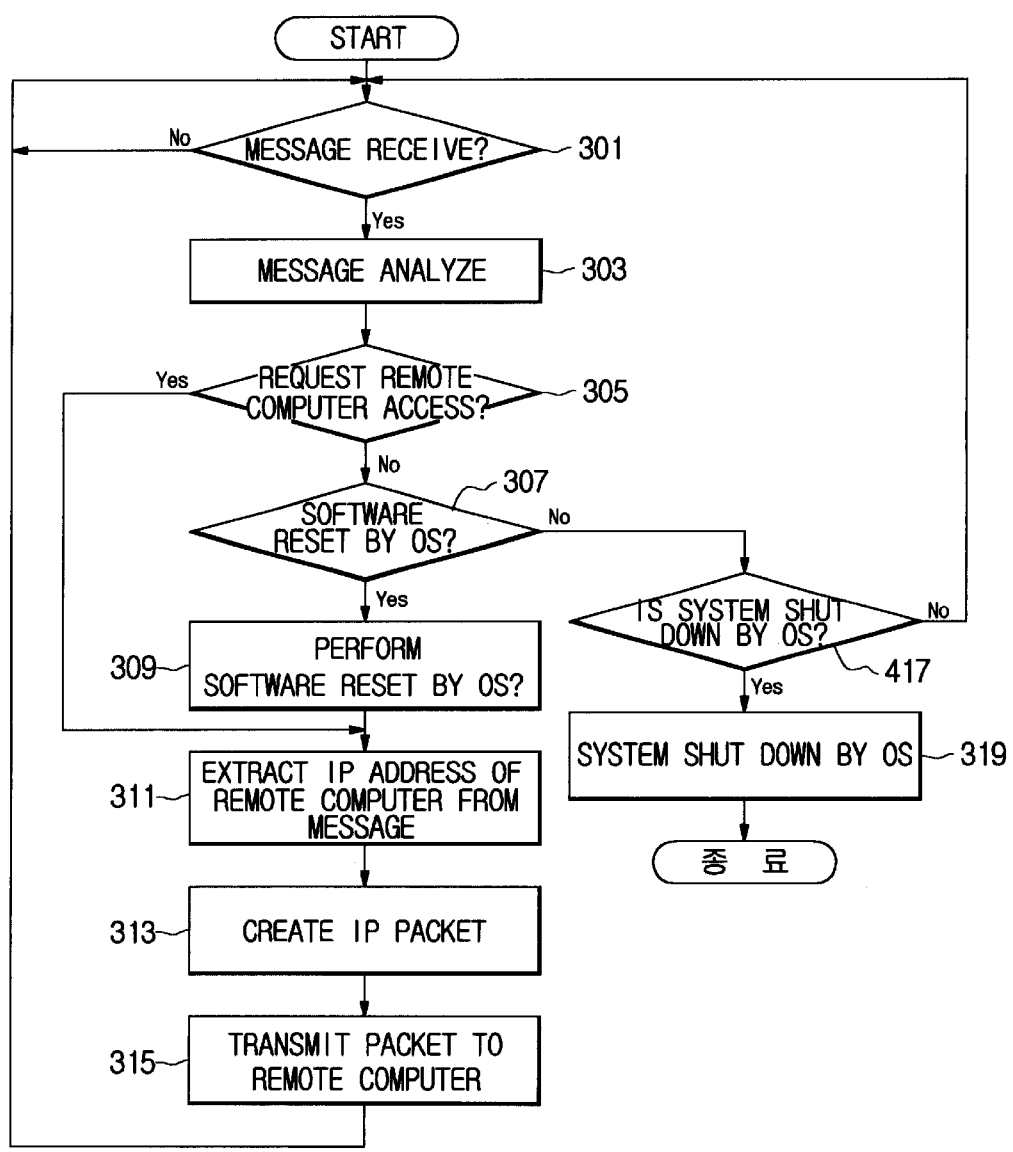
FIG. 3 is a flow chart showing a control flow of a computer system according to one embodiment of the present invention.

FIG. 3 is a flow chart showing a control flow of the computer system 100 according to one embodiment of the present invention. Especially, FIG. 3 shows the flow chart allowing the computer system 100 to automatically access to the IP address of the remote computer, which is received from the remote control module 10.

Referring to FIG. 3, the control section 101 checks whether or not the message is received from the remote control module 10 through the serial transmission interface 104. If the message is received, message is received from the remote control module 10, the control section 101 analyzes the received message (step 303). Otherwise, the control section 101 waits for the message.

Then, the control section 101 determines whether or not the message requests a remote computer access (step 305). If the message requests the remote computer access, the control section 101 performs step 311. Otherwise, the control section 101 determines whether or not the software reset by means of the OS is requested (step 307). If the software reset by means of the OS is requested, the control section 101 performs the software reset by means of the OS (step 309). Otherwise, the control section 101 performs step 317.

After the software rest has been carried out by the OS, or when it is determined that the message requests the remote computer access in step 305, the control section 101 extracts the IP address of the remote computer from the message in step 311. In addition, the control section 101 creates a TCP/IP packet including the IP address of the computer system 100 (step 313). Then, the control section 101 transmits the TCP/IP packet to the remote computer and returns to step 301. At this time, the remote computer can obtain the IP address assigned to the computer system 101 and the user can access to the computer system by using the IP address of the computer system received in the remote computer, thereby obtaining required data.

Generally, in the TCP/IP SPEC consisting of 7 layers, a network layer can checks the IP address from which the packet is transmitted. Accordingly, when the computer system 100 accesses to the remote computer, the remote computer can recognize the IP address of the computer system 100. For example, the computer system 100 can assess to the remote computer by using a remote system access program, such as "telnet", and the remote computer can recognize the IP address of the computer system 100 by using an IP address back-tracking program. Then, the user accesses to data of the computer system 100 by using the access program including "telnet" and "ftp (file transfer protocol)".

On the other hand, when it is determined that the message does not request the software reset by the OS in step 307, the control section 101 determines whether or not the message requests the shut down of the system by means of the OS (step 317).

If the message requests the shut down of the system by means of the OS, the control section 101 performs the shut down of the system by means of the OS (step 319) and finishes the process. Otherwise, the control section 101 returns to step 301, waiting for the message.

Figure 4:
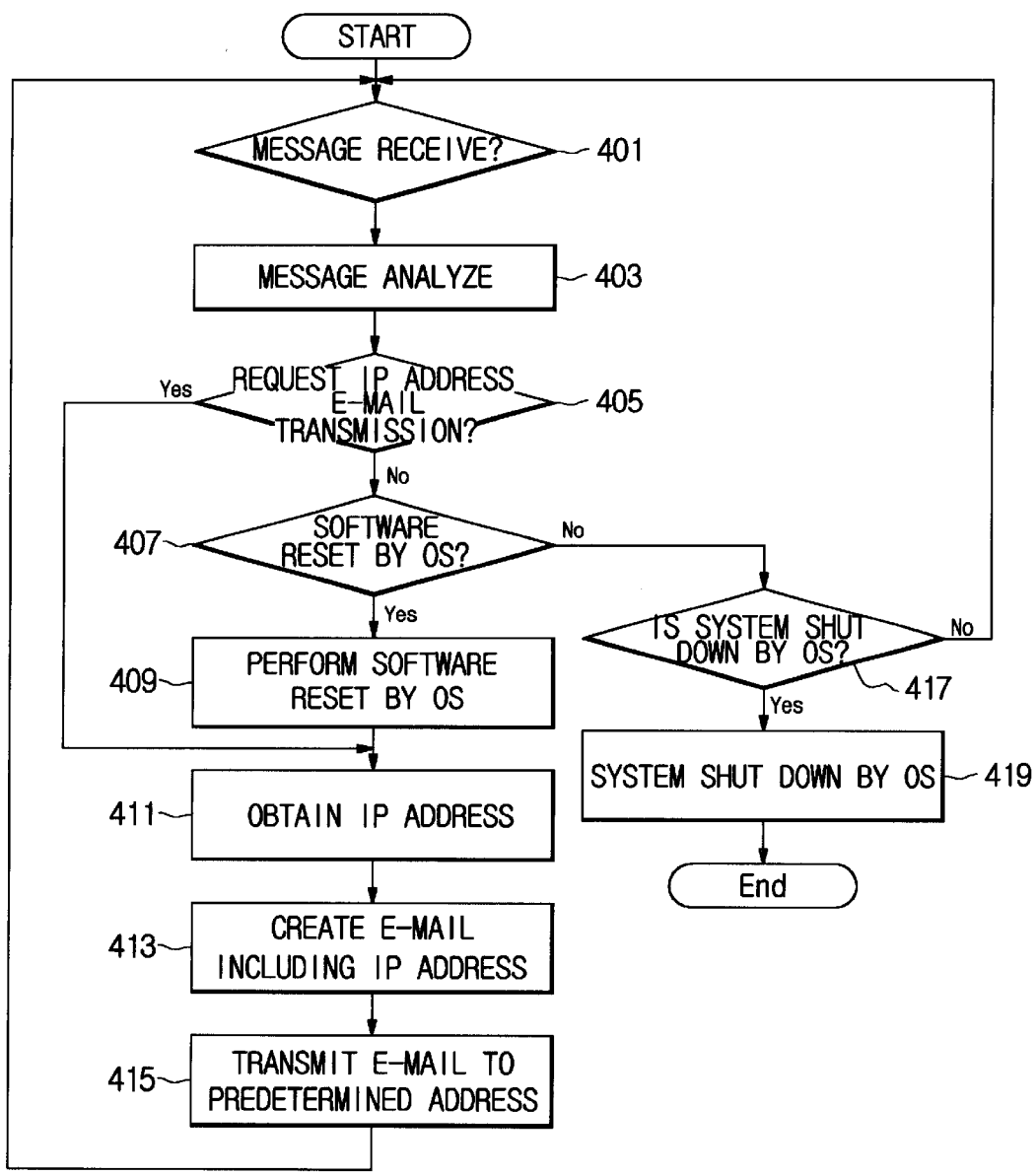
FIG. 4 is a flow chart showing a control flow of a computer system according to another embodiment of the present invention.

FIG. 4 is a flow chart showing a control flow of the computer system 100 according to another embodiment of the present invention. Especially, FIG. 4 shows the flow chart allowing the computer system 100 to transmit the IP address thereof to a predetermined E-mail address.

Referring to FIG. 4, the control section 101 checks whether or not the message is received from the remote control module 10 (step 401). If the message is received from the remote control module 10, the control section 101 analyzes the received message (403). Otherwise, the control section 101 waits for the message.

Then, the control section 101 determines whether or not the received message requests the transmission of the IP address E-mail. If the received message requests the transmission of the IP address E-mail, the control section 101 performs step 411. Otherwise, the control section 101 determines whether or not the message requests the software reset by means of the OS (step 407). If the message requests the software reset by means of the OS, the control section 101 performs the software reset (step 409). Otherwise, the control section performs step 417.

After the software rest has been carried out by the OS, or when it is determined that the message requests the transmission of the IP address E-mail in step 405, the control section 101 obtains the fixed or flexible IP address of the computer system 100 in step 411. In addition, the control section 101 creates an E-mail including the obtained IP address (step 413). Then, the control section 101 transmits the created E-mail to the predetermined E-mail address and returns to step 401 so as to waits for the message. At this time, the remote user can obtain the IP address of the computer system 100 by checking the E-mail address.

On the other hand, when it is determined that the message does not request the software reset by the OS in step 407, the control section 101 determines whether or not the message requests the shut down of the system by means of the OS (step 417). If the message requests the shut down of the system by means of the OS, the control section 101 performs the shut down of the system by means of the OS (step 419) and finishes the process. Otherwise, the control section 101 returns to step 401, waiting for the message.

As mentioned above, a function (or an executive file) for transmitting the IP address to the predetermined E-mail address can be executed by registering the function to a start program, which is run prior to a login screen of Windows, or can be executed by an order of the remote control module 10. The executive file, in case of Win 95, Win 98 and Win ME, can be registered in a registry. In case of Win NT, Win 200 and Win XP, the executive file can be registered in a service program.

On the other hand, according to the above embodiment, the remote control module 10 transmits an order requesting the transmission of the E-mail including the IP address, instead of the IP address of the remote computer, to the computer system 100. That is, the remote user does not require to input the IP address of the remote computer when carrying out the telephone communication. Accordingly, the remote user does not require to check the IP address of the remote computer. In addition, since the remote user can recognize the IP address of the computer system 100 through the E-mail, it is not required to run a separate program (for example, IP address back-tracking program) for obtaining the IP address of the computer system.

As mentioned above, according to the present invention, the power on/off of the computer, the hardware reset, and the shut down of the system & software reset by means of the OS can be carried out from the remote place, so the system can be prevented from the fatal damage caused by the forced-power on/off of the computer. In addition, since the computer transmits the IP address thereof to the remote computer or to the predetermined E-mail address, the remote user can easily obtain the IP address of the computer even if the computer uses the flexible IP address. As a result, the remote user can easily access to the computer by simply remote-controlling the computer even when the computer is powered off and uses the flexible IP address.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. A remote control module for a computer, which creates an order to control a shut down and a start of a computer system by analyzing a DTMF (dual tone multi frequency) signal received through a telephone line, the remote control module comprising:

a telephone line interface section for outputting the DTMF signal received through the telephone line by converting the DTMF signal into a predetermined voltage level;

an amplifying section for amplifying and filtering the signal transmitted from the telephone line interface section;

an A/D converter for converting an analog signal of the amplifying section into a digital signal;

a control section for extracting a computer remote control order from the DTMF signal by analyzing the digital signal transmitted from the A/D converter, and for creating a message based on the computer remote control order;

a first relay controlled by the control section so as to output a reset signal to a reset terminal of a power circuit of the computer system;

a second relay controlled by the control section so as to output an power on/off signal to a power terminal of the power circuit of the computer system; and a serial transmission interface section for receiving the message from the control section and transmitting the message to the computer system by converting the message in match with a serial transmission interface standard.

2. The remote control module as claimed in claim 1, wherein the control section includes a DSP (digital signal processor).

3. The remote control module as claimed in claim 1, wherein the message includes an order requesting the shut down of the computer system or a software reset by means of an operating system.

4. The remote control module as claimed in claim 1, wherein the message includes an IP address of a remote computer, and the computer system automatically accesses to the remote computer.

5. The remote control module as claimed in claim 1, wherein the first and second relays are driven in response to a key input signal generated from a reset key input section and a power key input section of the computer system.

6. The remote control module as claimed in claim 1, wherein the telephone line interface section generates an alarm signal notifying a ring signal to the control section when the ring signal is received therein.

7. The remote control module as claimed in claim 6, wherein the control section performs a hook off process by controlling the telephone line interface section when incoming ring signals reaches a predetermined number.

8. The remote control module as claimed in claim 6, wherein the serial transmission interface standard is RS 232C(recommended standard-232C).

9. A method of creating an order for controlling a shut down and a start of a computer system with using a remote control module by analyzing a DTMF (dual tone multi frequency) signal received through a telephone line in a computer unit having the remote control module and the computer system, the method comprising the steps of:
   i) checking whether or not incoming ring signals reach a predetermined number;
   ii) receiving the DTMF signal by performing a hooking off process when the incoming ring signal exceeds the predetermined number, extracting a computer remote control order by analyzing the received DTMF signal, and then performing a hook on process; and
   iii) outputting a power on signal to a power circuit of the computer system when the computer remote control order requests a power on, and transmitting an IP address of a remote computer to the computer system through a serial transmission interface, the IP address being obtained from the computer remote control order, the computer system automatically accessing to the remote computer.

10. The method as claimed in claim 9, further comprising a step of transmitting a system shut down order to the computer system through the serial transmission interface, when the computer remote control order requests the shut down of the computer system by means of an operating system.

11. The method as claimed in claim 9, further comprising a step of transmitting a software reset order including the IP address of the remote computer to the computer system through the serial transmission interface, when the computer remote control order requests a software reset of the computer system by means of an operating system.

12. The method as claimed in claim 9, further comprising a step of outputting a reset signal to the power circuit of the computer system and transmitting the IP address of the remote computer to the computer system through the serial transmission interface, when the computer remote control order requests a hardware reset.

13. The method as claimed in claim 9, further comprising a step of outputting a power off signal to the power circuit of the computer system, when the computer remote control order requests a power off.

14. The method as claimed in claim 9, further comprising the steps of outputting a power off signal to the power circuit of the computer system, outputting the power on signal to the power circuit of the computer system after a predetermined time lapses, and transmitting the IP address of the remote computer to the computer system through the serial transmission interface, when the computer remote control order requests a power on after a power off.

15. The method as claimed in claim 9, further comprising of the steps of detecting a response tone of an automatic answering machine through a tip terminal when a ring signal is received, detecting a voice signal when the response tone of the automatic answering machine is detected, performing a hook on process when the voice signal is detected, and receiving the DTMF signal after performing a hook off process when the voice signal is not detected.

16. A method of creating an order for controlling a shut down and a start of a computer system with using a remote control module by analyzing a DTMF (dual tone multi frequency) signal received through a telephone line in a computer unit having the remote control module and the computer system, the method comprising the steps of:
   i) checking whether or not incoming ring signals reach a predetermined number;
   ii) receiving the DTMF signal by performing a hooking off process when the incoming ring signal exceeds the predetermined number, extracting a computer remote control order by analyzing the received DTMF signal, and then performing a hook on process;
   iii) outputting a power on signal to a power circuit of the computer system when the computer remote control order requests a power on; and
   iv) transmitting an order requesting a transmission of an E-mail including an IP address of a computer system to the computer system through a serial transmission interface.

17. A method of controlling a shut down and a start of a computer system based on an order transmitted from a remote control module in a computer unit having the computer system and the remote control module, which creates the order for controlling the computer system by analyzing a DTMF (dual tone multi frequency) signal received through a telephone line, the method comprising the steps of:
   i) analyzing a message when the message is received from the remote control module;
   ii) performing a normal software reset when the received message requests the software reset by means of an operating system, then, automatically accessing to an IP address of a remote computer included in the message;
   iii) performing a normal shut down of the computer system when the received message requests a normal shut of the computer system by means of the operating system; and
   iv) automatically accessing to the IP address of the remote computer included in the message, when the received message requests a remote computer access.

18. A method of controlling a shut down and a start of a computer system based on an order transmitted from a remote control module in a computer unit having the computer system and the remote control module, which creates the order for controlling the computer system by analyzing a DTMF (dual tone multi frequency) signal received through a telephone line, the method comprising the steps of:
   i) analyzing a message when the message is received from the remote control module;
   ii) performing a normal software reset when the received message requests the software reset by means of an operating system, then, transmitting an E-mail including an IP address of the computer system to a predetermined address; and
   iii) transmitting the E-mail including the IP address of the computer system to the predetermined address, when the received message requests an IP address E-mail transmission.

\* \* \* \* \*